(12) United States Patent
Alve (10) Patent No.: US 8,407,803 B2
(45) Date of Patent: Mar. 26, 2013

(54) METHOD, APPARATUS AND COMPUTER PROGRAM PRODUCT FOR PROVIDING PROTECTED CONTENT TO ONE OR MORE DEVICES BY REACQUIRING THE CONTENT FROM A SERVICE

(75) Inventor: Jukka Antero Alve, Vantaa (FI)

(73) Assignee: Nokia Corporation

( * ) Notice: Subject to any disclaimer, the term of this patent is extended or adjusted under 35 U.S.C. 154(b) by 217 days.

(21) Appl. No.: 12/825,018

(22) Filed: Jun. 28, 2010

(65) Prior Publication Data

US 2010/0333209 A1    Dec. 30, 2010

Related U.S. Application Data

(60) Provisional application No. 61/221,891, filed on Jun. 30, 2009.

(51) Int. Cl.
*G06F 17/30*  (2006.01)
(52) U.S. Cl. ............................................. 726/26; 726/27
(58) Field of Classification Search .......... 380/201–203; 713/161, 163, 165, 167, 176; 726/26–27, 726/30–31; 705/57–59
See application file for complete search history.

(56) References Cited

U.S. PATENT DOCUMENTS 7,748,044 B2 * 6/2010 Kuo et al. ....................... 726/26
2007/0156601 A1   7/2007 Brew et al.
2008/0249946 A1  10/2008 Candelore
2008/0250508 A1  10/2008 Montague et al.
2009/0031428 A1 * 1/2009 Brew et al. ...................... 726/27

FOREIGN PATENT DOCUMENTS

WO   2004111804 A2   12/2004
WO   2006043784 A1    4/2006

OTHER PUBLICATIONS

International Search Report and Written Opinion, received in corresponding Patent Cooperation Treaty Application No. PCT/IB2010/001440. Dated Oct. 15, 2010. 12 pages.

* cited by examiner

*Primary Examiner* — Hosuk Song
(74) *Attorney, Agent, or Firm* — Alston & Bird LLP (57) ABSTRACT

An apparatus for providing protected content to a device(s) by reacquisition of the content from an entity of a service may include a processor and a memory storing executable computer program code that causes the apparatus to at least perform operations including determining one or more Digital Rights Management (DRM) formats that one or more devices support in response to receipt of an indication(s). The computer program code may cause the apparatus to arrange data identifying the devices based at least in part on the DRM formats that correspond to the devices. The computer program code may cause the apparatus to facilitate receipt of content in at least one DRM format that at least one of the devices supports in response to a determination that a first device was selected to provide the content to a device for rendering. Corresponding computer program products and methods are also provided.

20 Claims, 6 Drawing Sheets

METHOD, APPARATUS AND COMPUTER PROGRAM PRODUCT FOR PROVIDING PROTECTED CONTENT TO ONE OR MORE DEVICES BY REACQUIRING THE CONTENT FROM A SERVICE

RELATED APPLICATIONS

This application was originally filed as U.S. Provisional Application No. 61/221,891 on Jun. 30, 2009, which is incorporated herein by reference in its entirety.

TECHNOLOGICAL FIELD

Embodiments of the present invention relate generally to content sharing technology and, more particularly, relate to an apparatus, method and a computer program product for providing or uploading protected content to one or more devices by reacquisition of the content from an entity of a service.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. One area in which there is a demand to increase ease of information transfer relates to the sharing of information between multiple devices and potentially between multiple users. In this regard, given the ability for modern electronic devices to create and modify content, and also to distribute or share content, it is not uncommon for users of such devices to become prolific users and producers of media content such as for example photos, music, videos, etc. Networks and services have been developed to enable users to move created content to various points within the networks.

To complement mechanisms for distribution and sharing of personal content, mechanisms have also been developed to provide for distribution of content in various formats as well as facilitating conversion of content in one format to another format. For instance, the Digital Living Network Alliance (DLNA) is an industry collaboration forum that prepares guidelines used by producers of electronic devices to allow the electronic devices to share content with each other across a network such as for example a home network. DLNA guidelines rely on the Universal Plug and Play (UPnP) architecture, which defines basic functionality for digital media server devices and renderer devices, and discovery mechanisms for discovering the devices and their content on a home network. DLNA guidelines improve interoperability by defining some mandatory media formats that both servers and renderers are required to support, and they also define a number of optional media formats and related identifiers, so that it is possible to discover content that is stored on a server device in an optional media format that will play on a particular renderer device that supports the optional media format.

The DLNA Content Protection Subcommittee (CPS) is currently preparing Digital Rights Management (DRM) Interoperability Guidelines that are aimed at providing similar interoperability for DRM protected content, enabling a user to convert content that is in a particular DRM format to a different DRM format.

In this regard, two possible solutions have been identified for converting content from one DRM format to another DRM format. First, the content may either be converted from a first DRM format (also referred to herein as format A) into a second DRM format (also referred to herein as format B) by transcoding (also referred to as transcrypting) the content. In this regard, a device may decrypt the first DRM format and re-encrypt the content into the second DRM format. Second, the content may be acquired from a service that contains the content in multiple DRM formats (e.g., A, B, and C), and the service may provide the content in the desired DRM format (e.g., format B) to a device that requests or desires the content in that format, provided that the conditions set by a rights owner is met. For instance, if a user of a device is currently using content in a given DRM format (e.g. DRM format A) but desires the content in a different DRM format (e.g., DRM format B), the user may utilize a device to request the content in the desired format from a network entity of a service. An example of such a service is a Coral Ecosystem service, which uses interoperability solutions associated with different DRM formats that are provided by the Coral Consortium. This mechanism of obtaining content in a desired DRM format from a network entity of a service is referred to herein as reacquisition of the content or reacquiring the content.

Current approaches for reacquiring the content in a desired DRM format relates to instances in which content is downloaded from a network device of the Coral Ecosystem and provided to a device (also referred to herein as target device) that desires the content.

In a download scenario, a target device that desires the content in a DRM format, such as for example DRM format B, may request it from a source server and if the source server does not have the content in the desired DRM format, the source server may request the content in the desired DRM format from the Coral Ecosystem. The request will typically include a token that indicates that the target device has rights to use the content in another DRM format such as for example DRM format A and may indicate that the target device is capable of supporting DRM format B. The source server or the Coral Ecosystem may then check whether the rights to the content in the DRM format B can be granted to the target device, based at least in part on the data associated with the token and the source server or the Coral Ecosystem may deliver the content to the target device in DRM format B.

It should be pointed out that currently there are no suitable solutions for allowing a source device to upload content that the source device is capable of supporting in a DRM format to another electronic device, such as for example a target device. This is because there is currently no suitable mechanism available for the source device to determine the DRM formats that are supported by electronic rendering devices, in its network, that may play or render the content. It is worth noting that in accordance with the original DLNA/UPnP architecture, the rendering device that the user intends to use to render the content may be a different device than the target device to which the content is uploaded. If the DRM format capabilities of the electronic device that the user intends to use to play or render the content are not known to the source device, the source device may reacquire the content from a service such as for example the Coral Ecosystem service in a DRM format that the electronic rendering device is incapable of supporting. In this regard, the electronic rendering device would be unable to play or render the content once the content is uploaded to the target device since the electronic rendering device may not support the DRM format of the content.

For instance, consider an example in which a user of a server desires to upload content that it is capable of supporting to another electronic device in its network (e.g., home network) so that this electronic device may render or play the content. The server in this example may be capable of supporting desired content in DRM format A but may not have a locally stored copy of the content in DRM formats B and C. In this regard, the server may communicate with a target device and determine that the target device is capable of supporting the content in DRM formats B and C. Since the server only has the content locally stored in DRM format A the server may decide to request the content in DRM format B from a service such as the Coral Ecosystem service. The request will typically include a token that is used to prove that the server has possession of the content in DRM format A and that the target device may support content in DRM format B.

In this regard, the Coral Ecosystem may provide the content to the target device in DRM format B. In response, the target device may attempt to stream the content in DRM format B to an electronic device in its network with the intent that the electronic device will play the content. However, the electronic device may only be capable of supporting DRM format C and in this regard the electronic device will typically not be able to play the content. As such, current approaches for a source device to upload content to a target device so that another electronic device may render or play the content may result in problems associated with the electronic device being unable to use the content as well as drawbacks associated with disappointment and frustration for the user of the server, in this example. This is because the user of the server may have to utilize some other mechanism to provide the content to the electronic device in a DRM format that the electronic device is capable of supporting.

Using another approach to provide the electronic device with the content in an appropriate format may be a cumbersome and time consuming task since the user of the server may have to remove the content from the server, and save the content to another device that is capable of transcoding the content into a DRM format that is supported by the electronic device. The user may then need to attempt to upload (or stream) the content to the electronic device again, which may also frustrate the user due to the time involved to perform this task.

It should be pointed out that one approach to overcoming the drawbacks of the current approaches for a source device to upload content to a target device in a format supported by another electronic device that is intended to play the content is to ask the user which DRM formats that the electronic device utilizes. However, this approach requires user interaction and oftentimes the user does not know what DRM formats an electronic device on the network is capable of supporting. As such, this approach may still result in the electronic device being unable to play or render the content in an appropriate DRM format.

In view of the drawbacks described above, it may be desirable to provide an improved mechanism for uploading protected content to one or more electronic server devices in a DRM format that the electronic rendering devices are configured to support so that the intended electronic rendering devices may use or render the content.

BRIEF SUMMARY

A method, apparatus and computer program product are therefore provided that may send or upload protected content to one or more devices by reacquisition of the content from an entity such as for example a service. One or more devices or terminals of the exemplary embodiments are configured to identify one or more electronic devices in a network (e.g., a home network) that may play or render content and may generate a list (e.g., a DRM format capabilities list) of the electronic devices and their associated DRM format capabilities. The list may be provided to a device or entity such as for example a server so that the server may know the supported DRM format capabilities of the electronic devices in the network (e.g., a home network).

When a user desires to upload content to one of the electronic devices, the user first needs to select the target device. Selection of the target device in which to upload the content to may be performed via a user interface of a source server. As a second selection, the user may indicate which electronic device(s) he or she would like the content to be renderable on. Based on the user's selection of one or more electronic devices, the server may evaluate data in a DRM format capabilities list and determine a DRM format that the selected electronic device is configured to support. In some exemplary embodiments, instead of asking the user which electronic device he or she would like to be able to render or play the content on, the server may automatically determine a preferred electronic rendering device and use its DRM capabilities for determining the DRM format for the content upload based on a priority or order of the electronic devices in the list. In this regard, the exemplary embodiments may determine a DRM format that the preferred electronic device is configured to support.

The server may determine whether it supports the DRM format of the electronic device and may also determine whether a device such as for example a target device (also referred to herein as an intermediary device) supports the DRM format of the electronic device. If the server and the target device both support the DRM format of the electronic device and the server has a locally stored copy of the content in the DRM format supported by the electronic device, the server may provide the content in the DRM format to the target device which may render the content to the electronic device. In this regard, the electronic device may play the rendered content.

If the server does not have a locally stored copy of the content in the DRM format supported by the electronic device, the server may request the content in the DRM format supported by the electronic device from a network entity (e.g., network server) and the network entity may upload the content in the DRM format supported by the electronic device to the target device which may provide the content to the electronic device so that the electronic device may render the content (e.g., play the content). In an exemplary embodiment, the target device may provide the content to the electronic device by streaming the content to the electronic device.

Accordingly, embodiments of the invention may provide a method, apparatus and computer program product for improving capabilities with respect to sharing content on multiple devices.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention. The term "render" or "rendering" as used herein may, but need not, refer to the playing of content, executing content, or displaying content on a device. The term "upload" or "uploading" as used herein may be used interchangeably with the terms "send", "sending," "transmit," "transmitting," "provide," "providing" and similar terms to refer to content in a DRM format(s) that may be sent from one device to another device.

It should be pointed out that some of the content referred to herein relates to audio, photographs, images, video and any other suitable content in one or more Digital Rights Management (DRM) formats (also referred to herein as formats). Examples of the DRM formats referred to herein include, but not limited to, Open Mobile Alliance (OMA) DRM, Windows™ Media DRM and Digital Video Broadcasting (DVB) Content Protection & Copy Management (CPCM).

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
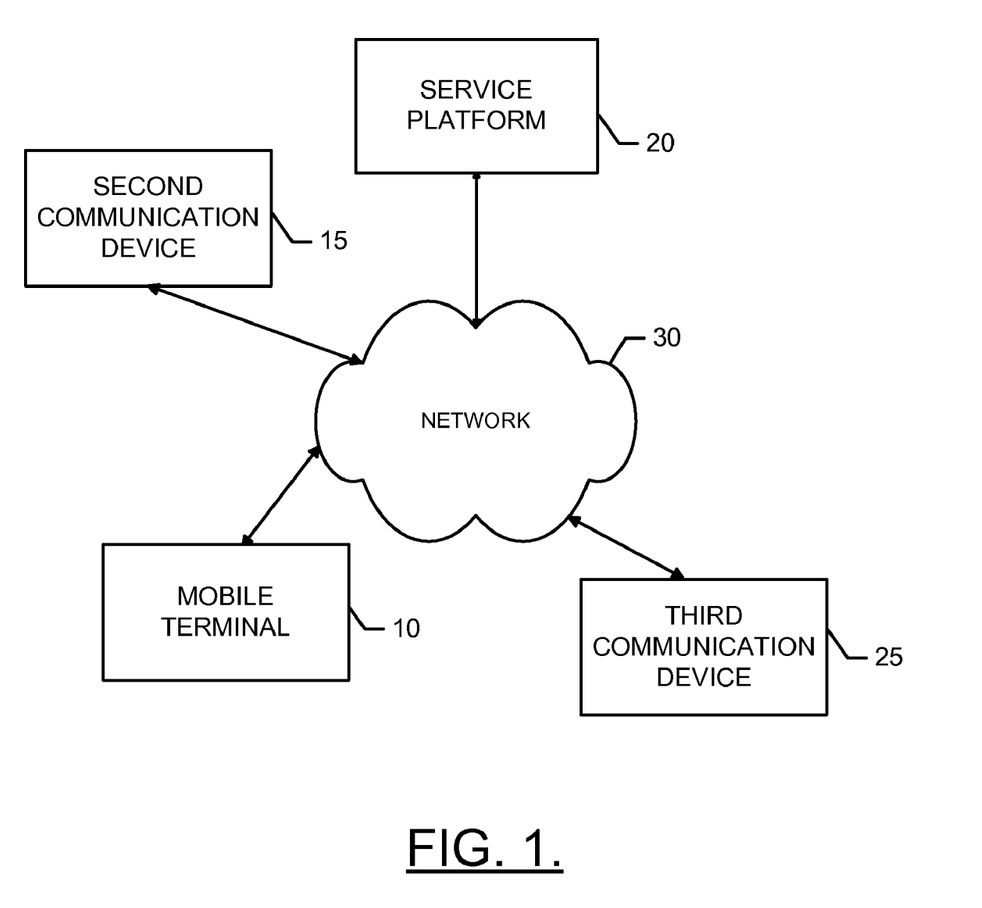
FIG. 1 is a schematic block diagram of a system according to an exemplary embodiment of the invention.

FIG. 1 illustrates a block diagram of a system that may benefit from embodiments of the present invention. It should be understood, however, that the system as illustrated and hereinafter described is merely illustrative of one system that may benefit from embodiments of the present invention and, therefore, should not be taken to limit the scope of embodiments of the present invention. As shown in FIG. 1, an embodiment of a system in accordance with an example embodiment of the present invention may include a mobile terminal 10 configured to communicate with numerous other devices including, for example, a service platform 20 via a network 30.

In some embodiments of the present invention, the system may further include one or more additional communication devices (e.g., second and third communication devices 15 and 25) such as other mobile terminals, personal computers (PCs), servers, network hard disks, file storage servers, home appliances or consumer electronic (CE) devices, including but not limited to MP3 players, audio devices (e.g., compact disc (CD) players), televisions, digital video recorders, set-top boxes, remote controls, gaming devices, GPS devices, automotive navigation system devices, digital cameras and devices capable of playing video and/or the like, which may be capable of communicating with the mobile terminal 10 and may be accessible by the service platform 20. However, not all systems that employ embodiments of the present invention may comprise all the devices illustrated and/or described herein. Moreover, in some cases, embodiments may be practiced on a standalone device independent of any system.

In an exemplary embodiment, the service platform 20, the mobile terminal 10 and the second and third communication devices 15 and 25 may implement one or more Universal Plug and Play (UPnP) protocols and may be UPnP device architecture.

The network 30 may include a collection of various different nodes (of which the second and third communication devices 15 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30.

Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. In some embodiments, the network may be a point-to-point (P2P) network. Thus, the network 30 may be a cellular network, a mobile network and/or a data network, such as a local area network (LAN), a metropolitan area network (MAN), and/or a wide area network (WAN), e.g., the Internet. In turn, other devices such as processing elements (e.g., personal computers, server computers or the like) may be included in or coupled to the network 30. By directly or indirectly connecting the mobile terminal 10 and the other devices (e.g., service platform 20, or other mobile terminals or devices such as the second communication device 15) to the network 30, the mobile terminal 10 and/or the other devices may be enabled to communicate with each other, for example, according to numerous communication protocols, to thereby carry out various communication or other functions of the mobile terminal 10 and the other devices, respectively. As such, the mobile terminal 10 and the other devices may be enabled to communicate with the network 30 and/or each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as wireless LAN (WLAN), Worldwide Interoperability for Microwave Access (WiMAX), WiFi (Wireless Fidelity), ultra-wide band (UWB), Wibree techniques and/or the like and fixed access mechanisms such as digital subscriber line (DSL), cable modems, Ethernet and/or the like.

One or more communication terminals such as the mobile terminal 10 (also referred to herein as a first communication device) and the second and third communication devices 15 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 15 and 25 (and/or other devices) to the network 30, the mobile terminal 10 and the second and third communication devices 15 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 15 and 25, respectively. Additionally, it should be pointed out that the second and third communication devices 15 and 25 may be in communication with each other via the network 30.

In an exemplary embodiment, the second communication device 15 may be an entity such as for example a server (e.g., a Digital Media Server). The third communication device 25 may be an electronic device, such as for example a Digital Media Renderer device that is configured to play or execute content in one or more DRM formats. It should be pointed out that when the third communication device connects to the network it is configured to automatically announce or advertise its corresponding network address and supported device and services types as well as capabilities such as for example the DRM formats that it is capable of supporting. This announcement may be in the form of a message or signal that enables devices (e.g., mobile terminal 10) that are capable of recognizing the signal to obtain the data associated with the network address, the supported device and service types as well as the supportable DRM formats of the third communication device. The third communication device may also announce or advertise any changes regarding its status. In this regard, data associated with the changes may be provided in a message or signal that is sent to one or more devices (e.g., mobile terminal 10). The changes in status may include but are not limited to changes associated with a network address, supported device and service types as well as the capabilities (e.g., supported DRM format capabilities) of the third communication device.

In an example embodiment, the service platform 20 may be a device or node such as a server or other processing element. The service platform 20 may have any number of functions or associations with various services. As such, for example, the service platform 20 may be an entity such as for example a server, server bank or other computer configured to provide one or more services (e.g., Internet services) via the network 30. Additionally, the service platform 20 may be a backend server associated with one or more other functions or services. In an exemplary embodiment, the service platform 20 may provide, among other things, content management, content sharing, content acquisition, content reacquisition and other services related to communication and media content. In an exemplary embodiment the service platform 20 may be network device (e.g., network server) that is configured to store content in one or more DRM formats. The service platform 20 may be configured to receive requests for content in a desired DRM format from one or more devices such as for example a server (e.g., second communication device 15) or other communication devices (e.g., mobile terminal 10) via network 30.

In this regard, the service platform 20 is configured to verify that a device has rights to the requested content in the desired DRM format and may determine whether a device is configured to support the content in the desired DRM format. The device may, for example, have the rights through membership in a domain, which may be regarded as the set of devices registered or otherwise associated with a single user account on the service platform 20. In response to verifying that the device has rights to the requested content and determining that the device is configured to support the content in the desired DRM format, the service platform 20 is configured to upload the content in the desired DRM format to a device. It should be pointed out that the service platform 20 may verify that a device has rights to content in a desired DRM format by evaluating data associated with a token. The data that is associated with the token may be sent to the service platform 20 in a request from a device such as for example a server.

As such, the service platform 20 may represent a potential host for a plurality of different services or information sources. In some embodiments, the functionality of the service platform 20 is provided by hardware and/or software components configured to operate in accordance with known techniques for the provision of information to users of communication devices. However, at least some of the functionality provided by the service platform 20 may be data processing and/or service provision functionality provided in accordance with embodiments of the present invention.

Furthermore, although not shown in FIG. 1, the mobile terminal 10, the service platform 20 and the second and third communication devices 15 and 25 may communicate in accordance with, for example, radio frequency (RF), Bluetooth (BT), Infrared (IR) or any of a number of different wireline or wireless communication techniques, including LAN, Wireless LAN (WLAN), Worldwide Interoperability for Microwave Access (WiMAX), WiFi, Ultra-Wide Band (UWB), Wibree techniques and/or the like. As such, the mobile terminal 10, the service platform 20 and the second and third communication devices 15 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like. Additionally, it should be pointed out that the mobile terminal 10, the service platform 20 and the second and third communication devices 15 and 25 may communicate with each other via one or more communication channels.

Figure 4:
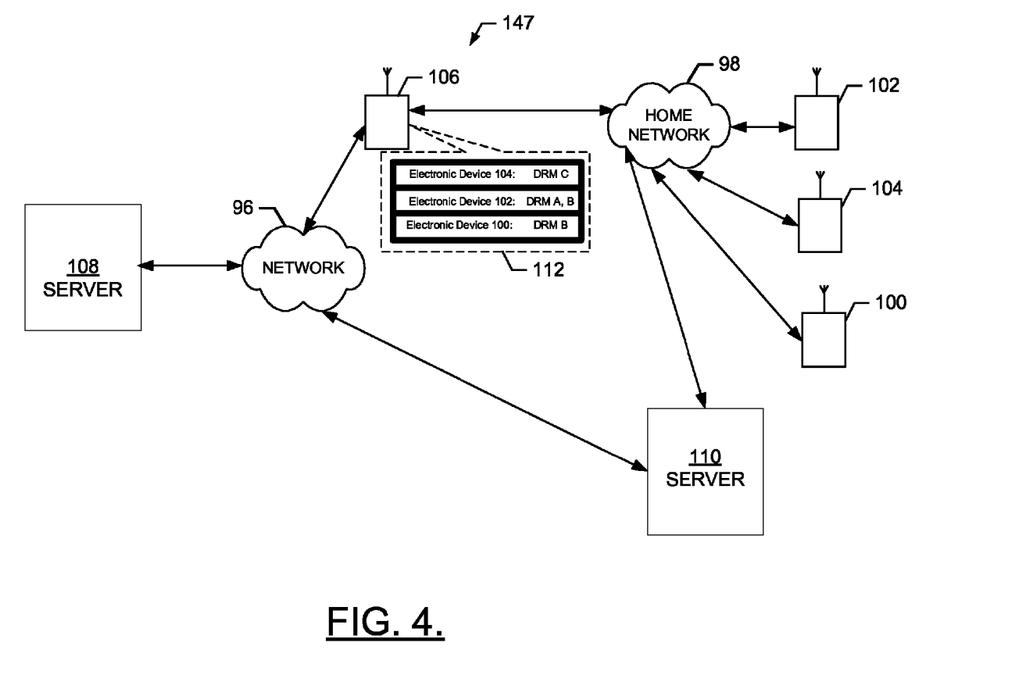
FIG. 4 is a schematic block diagram of a system for uploading protected content to one or more devices by reacquisition of the content.

In an exemplary embodiment, the mobile terminal 10 may, but need not, be a target device (e.g., intermediary device 106 of FIG. 4 to which content may be uploaded). It should be pointed out that mobile terminal 10 may be configured to automatically detect one or more electronic devices (e.g., third communication device 25) when the electronic devices join a network. The mobile terminal 10 is configured to render content in one or more DRM formats. The mobile terminal 10 may stream content in a DRM format to one or more electronic devices so that the electronic devices may play the content. Additionally, the mobile terminal 10 is also configured to determine the capabilities such as for example the DRM format capabilities that the detected electronic devices are configured to support. In response to the mobile terminal 10 joining or being added to a network (e.g., network 30 or a home network) the mobile terminal 10 may announce or advertise to the electronic devices that it has joined the network. The mobile terminal 10 may also search for electronic devices of interest in the network.

In example embodiments, the first communication device (e.g., the mobile terminal 10) may be any of multiple types of mobile communication and/or computing devices such as, for example, a wireless telephone or other devices such as portable digital assistants (PDAs), pagers, mobile televisions, mobile telephones, gaming devices, laptop computers, cameras, camera phones, video recorders, audio/video players, radios, global positioning system (GPS) devices, or any combination of the aforementioned, and other types of voice and text communications devices. The second and third communication devices 15 and 25 may be mobile or fixed communication devices. In one example, the second and third communication devices 15 and 25 may be remote computers or terminals such as personal computers (PC) or laptop computers.

In an exemplary embodiment, the second communication device 15 (e.g., a server) is configured to request content in a DRM format that the mobile terminal 10 and/or third communication device 25 (e.g., electronic device such as for e.g., a rendering device) is configured to support in instances in which the second communication device 15 does not have the content stored locally. In this regard, the second communication device 15 is configured to request content in a DRM format that one or more electronic devices (e.g., third communication device 25) are capable of supporting when the second communication device 15 is also capable of supporting the DRM formats of the electronic devices. The request may be sent by the second communication device to the service platform 20 and the service platform may upload the content in the requested DRM format to the mobile terminal 10 which may provide the content to one or more electronic devices (e.g., third communication device 25) so that these electronic devices may render the content.

On the other hand, if the second communication device 15 has a locally stored copy of the content in a desired DRM format, the second communication device may upload the content in the desired format to the mobile terminal 10, without requesting the content from the service platform 20. The mobile terminal 10 may provide the content to one or more electronic devices so that these electronic devices may render (e.g., play) the content.

In an exemplary embodiment, the mobile terminal 10 as well as the third communication device 25 may employ an apparatus (e.g., the apparatus of FIG. 2) capable of employing embodiments of the invention.

Figure 2:
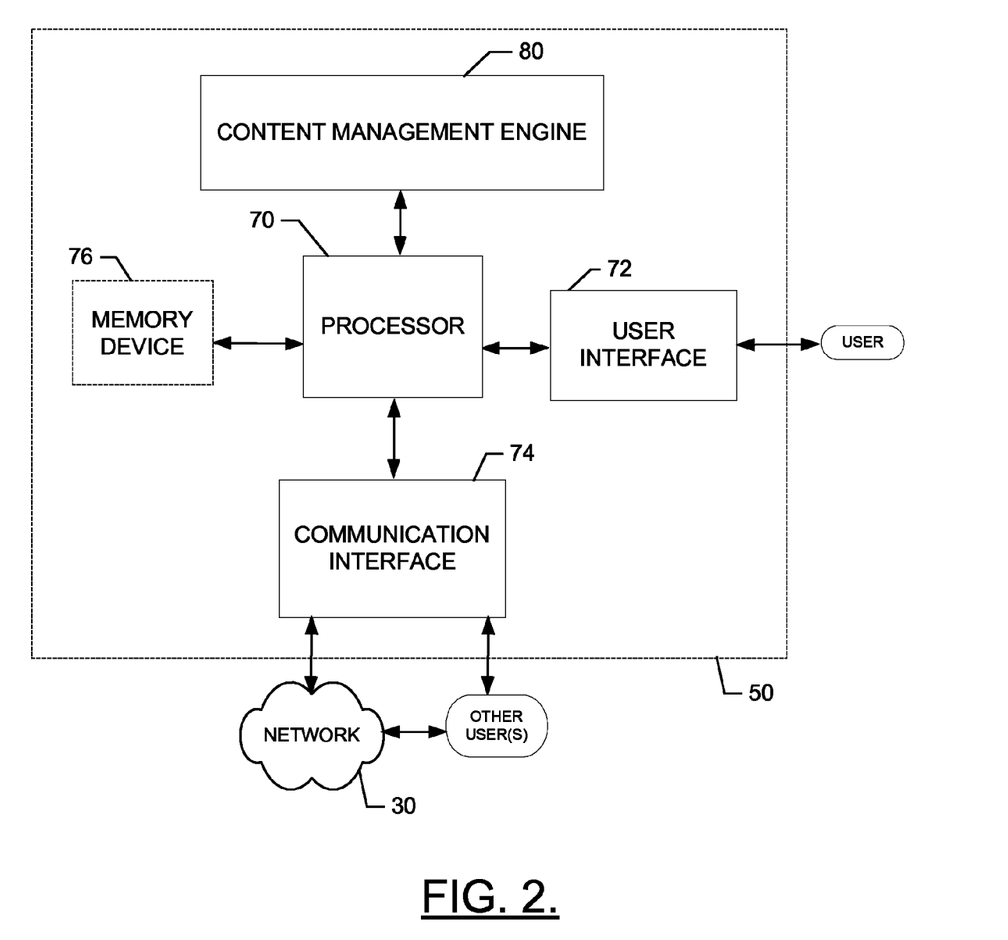
FIG. 2 is a schematic block diagram of an apparatus for uploading protected content to one or more devices by reacquisition of the content according to an exemplary embodiment of the invention.

FIG. 2 illustrates a schematic block diagram of an apparatus for uploading protected content to one or more devices by reacquisition of the content according to an exemplary embodiment of the invention. The apparatus 50 of FIG. 2 may be employed, for example, on the mobile terminal 10 (and/or the second communication device 15 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, embodiments may be employed on a combination of devices. Accordingly, some embodiments of the present invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some of the devices or elements may be omitted in certain embodiments.

The apparatus 50 may include or otherwise be in communication with a processor 70, a user interface 72, a communication interface 74 and optionally a memory device 76. The memory device 76 may include, for example, volatile and/or non-volatile memory. The memory device 76 may be configured to store information, content (e.g., video and audio data, images, photographs, etc.) in one or more DRM formats, data, files, directories, applications, one or more processes, instructions or the like for enabling the apparatus to carry out various functions in accordance with exemplary embodiments of the present invention. At least some of the information or data may correspond to the DRM formats that the apparatus is capable of supporting. Additionally, the information or data may correspond to one or more DRM formats that other electronic devices are capable of supporting. In an exemplary embodiment, the DRM capabilities of the electronic devices may be arranged in an ordered list based on a priority assigned to the electronic devices, for example. The priority assigned to the electronic devices may, but need not, be based, in part, on the DRM formats that the electronic devices are configured to support. The memory device 76 may be configured to buffer input data for processing by the processor 70. Additionally or alternatively, the memory device 76 may be configured to store instructions for execution by the processor 70. As yet another alternative, the memory device 76 may be one of a plurality of databases that store information and/or media content.

In some exemplary embodiments, the apparatus 50 may not include the memory 76 but instead may include a buffer memory (not shown) that is configured to buffer content for processing by the processor 70. However, it should be pointed out that the storage capacity of the buffer memory is typically not large enough to store all of the data associated with the content (e.g., a video clip). In an exemplary embodiment, the buffer memory may buffer content during time intervals (e.g., every 10 seconds) while the content is being streamed to the apparatus 50 by another electronic device for example. In this regard, the processor 70 may play or execute the content in increments of data corresponding to the data that is buffered during the time intervals. As such, in some embodiments, the processor 70 may play or execute the buffered content while it is being streamed to the apparatus by another device even though the buffer memory may be incapable of storing all of the data associated with the content.

The processor 70 may be embodied in a number of different ways. For example, the processor 70 may be embodied as various processing means such as a processing element, a coprocessor, a controller or various other processing devices or circuitry including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein.

Alternatively, as another example, when the processor 70 is embodied as an executor of software instructions, the instructions may specifically configure the processor 70, which may otherwise be a general purpose processing element or other functionally configurable circuitry if not for the specific configuration provided by the instructions, to perform the algorithms and operations described herein. However, in some cases, the processor 70 may be a processor of a specific device (e.g., a mobile terminal) adapted for employing embodiments of the present invention by further configuration of the processor 70 by instructions for performing the algorithms and operations described herein.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). The communication interface 74 may receive and/or transmit data via one or more communication channels. In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, pointing device, a joystick, a display, a touch screen, a microphone, a speaker, or other input/output mechanisms. In an exemplary embodiment in which the apparatus is embodied as a server or some other network devices, the user interface 72 may be limited, remotely located, or eliminated.

It should be pointed out that the processor 70 may comprise user interface circuitry configured to control at least some functions of one or more elements of the user input interface 72 and/or the communication interface 74. The processor and/or user interface circuitry of the processor may be configured to control one or more functions of one or more elements of the user input interface and/or the communication interface through computer program instructions (e.g., software and/or firmware) stored on a memory accessible to the processor (e.g., volatile memory, non-volatile memory, and/or the like).

In an exemplary embodiment, the processor 70 may be embodied as, include or otherwise control a content management engine 80. The content management engine 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the content management engine 80 as described below. Thus, in examples in which software is employed, a device or circuitry (e.g., the processor 70 in one example) executing the software forms the structure associated with such means. In this regard, for example, the content management engine 80 may be configured to provide, among other things, for the detection of one or more electronic devices that may join a network as well as the network address, supported device and service types and capabilities of the electronic devices. At least some of the capabilities that the content management engine is configured to detect includes data associated with the DRM formats (e.g., DRM format C) that the electronic devices are configured to support.

The content management engine 80 may detect the electronic devices in response to receiving a message or signal from one or more of the electronic devices announcing or advertising that the electronic devices joined a network such as for example a home network, which may be a local area network or the like used to connect multiple devices within a residence of a user of the apparatus 50. Additionally, the content management engine 80 may detect the electronic devices in response to receiving messages or signals that may be periodically sent from the electronic devices indicating their network address, supported device and service types and capabilities.

It should be pointed out that the content management engine 80 is also configured to receive one or messages or signals sent from an electronic device indicating that a status of the electronic device changed. Information associated with the status change may indicate that the electronic device has a different network address, support different devices and service types as well as support different capabilities and any other suitable information. The content management engine 80 may also search for electronic devices in a network by sending one or more signals within the network which may identify the apparatus 50 and may include information requesting a response from other electronic devices within the network. Upon receiving the response from the electronic devices, the content management engine is configured to detect the electronic devices in the network.

The content management engine 80 may also announce or advertise when the apparatus 50 joins a network by generating a message or signal that may be sent to electronic devices in the network. The message or signal may include data indicating the network address of the apparatus 50, one or more supported device and service types as well as capabilities (e.g., supportable DRM formats) of the apparatus 50. The content management engine may also announce or advertise any changes to its status (e.g., changes to network address, supported device and service types, capabilities, etc.) by sending a message or signal to electronic devices in the network.

In an exemplary embodiment, the content management engine 80 may provide content in a desired DRM format to one or more detected electronic devices by streaming the content in the desired DRM format to one or more of the electronic devices.

In an alternative exemplary embodiment, the apparatus 50 may be able to receive content from an electronic device and play or execute the content but may not be able to stream the content to another electronic device. In this regard, the apparatus 50 (e.g., third communication device 25 in this embodiment) may, but need not, be a rendering device (also referred to herein as a Digital Media Renderer).

In exemplary embodiments in which the apparatus 50 may be a rendering device, the apparatus 50 may not include memory device 76, but rather may include a buffer memory for storing portions of the content (but not all of the content) while it is being streamed from an electronic device so that the content management engine 80 may play or execute the content.

In exemplary embodiments in which the apparatus 50 is configured to provide content in a desired DRM format to one or more electronic devices, the content management engine 80 is configured to generate a list of the DRM formats that the apparatus 50 is capable of supporting and may also generate a list of the DRM format capabilities (also referred to herein as a DRM format capabilities list) that the detected electronic devices in the network are configured to support. The content management engine 80 may generate a list of the DRM format capabilities that the detected electronic devices may support based on the information that the content management engine 80 receives when the electronic devices announce or advertise their capabilities in a message or signal in the manner described above.

The content management engine 80 may provide the DRM capabilities list to a server (e.g., second communication device 15). For instance, the content management engine 80 may provide the DRM capabilities list to the server so that the server may utilize the DRM capabilities list when a user indicates a desire to provide or upload DRM protected content to one or more electronic devices. In this regard, the server may upload the content in the desired DRM format to the content management engine 80 of the apparatus 50 or may request that a network entity (e.g., service platform 20) upload the content in the desired manner to the content management engine 80 of the apparatus 50 in the manner described more fully below.

Figure 3:
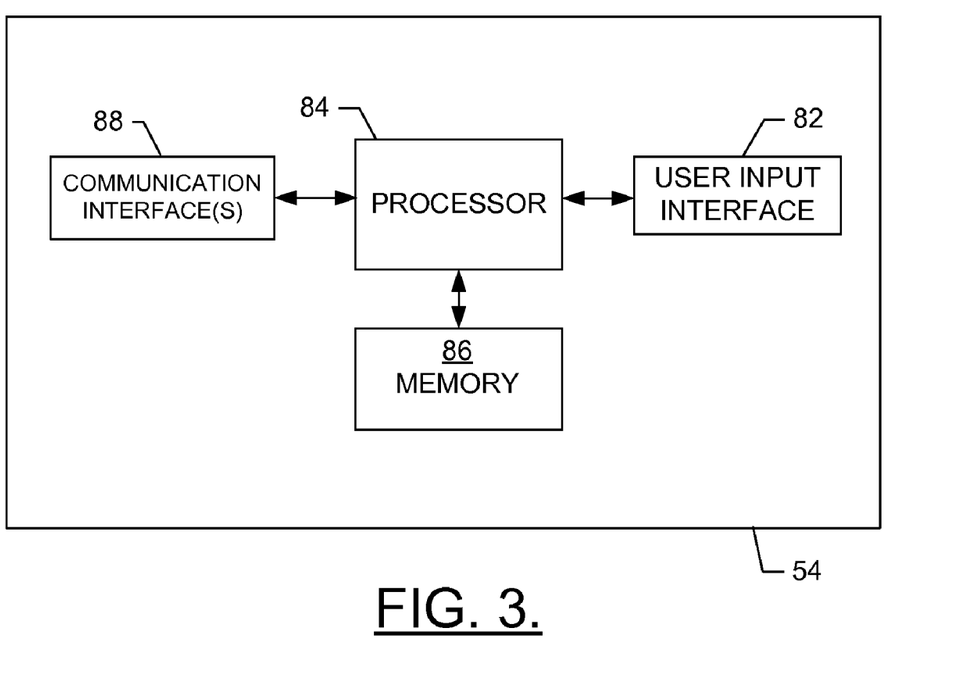
FIG. 3 is a schematic block diagram of an apparatus according to an exemplary embodiment of the invention.

Referring now to FIG. 3, a block diagram of an entity configured to operate as a server 54 (e.g., server 108 and/or server 110 of FIG. 4), is shown in accordance with one embodiment of the invention. The entity capable of operating as a server 54 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the invention. More particularly, for example, as shown in FIG. 3, the entity may include a processor 84 connected to a memory 86. The memory may comprise volatile and/or non-volatile memory, and typically stores content, data or the like. For example, the memory typically stores content transmitted from, and/or received by, the entity. The memory may store one or more DRM capabilities lists identifying the DRM capabilities that the server as well as other devices in a network is configured to support. The content may have one or more DRM formats. Also for example, the memory typically stores one or more client applications, instructions or the like for the processor 84 to perform steps associated with operation of the entity in accordance with embodiments of the invention.

The client applications may each comprise software operated by the respective entities. It should be understood, however, that the client applications described herein may alternatively comprise firmware or hardware, without departing from the spirit and scope of the invention. Generally, then, processor 84 may perform various functions of one or more client applications. The processor 84 may be embodied as various processing means such as a processing element, a coprocessor, a controller or various other processing devices or circuitry including integrated circuits such as, for example, an ASIC, an FPGA, a hardware accelerator, or the like in communication with a respective network entity (e.g., computing system, server, etc.). In an exemplary embodiment, the processor may receive one or more requests for content in a desired DRM format and may upload the content in the desired DRM format to a device in response to verifying that the device has rights to use the content in the desired DRM format and verifying that the device is configured to support the content in the desired DRM format. The processor 84 may also utilize one or more DRM capabilities lists to determine the DRM format of the content that should be uploaded to a device.

The processor 84 may also be connected to at least one interface or other means for displaying, transmitting and/or receiving data, content or the like. In this regard, the interface(s) may include at least one communication interface 88 or other means for transmitting and/or receiving data, content or the like. For example, the communication interface(s) may include a first communication interface for connecting to a first network, and a second communication interface for connecting to a second network. The interface(s) may also include at least one user interface that can include one or more earphones and/or speakers, a display, and/or a user input interface 82. The user input interface, in turn, may comprise any of a number of devices allowing the entity to receive data from a user, such as a microphone, a keypad, mouse, pointing device, a touch display, a joystick, image capture device (e.g., digital camera) or other input device.

It should be pointed out that the processor 84 may comprise user interface circuitry configured to control at least some functions of one or more elements of the user input interface 82 and/or the communication interface 88. The processor and/or user interface circuitry of the processor may be configured to control one or more functions of one or more elements of the user input interface and/or the communication interface through computer program instructions (e.g., software and/or firmware) stored on a memory accessible to the processor (e.g., volatile memory, non-volatile memory, and/or the like).

Referring now to FIG. 4, an exemplary embodiment of a system is provided for uploading DRM protected content to one or more devices by reacquisition of the content from a network entity. The system 147 may include an intermediary device 106 (also referred to herein as a target device, e.g., apparatus 50, mobile terminal 10) and electronic devices 100, 102 and 104 (e.g., apparatus 50), a server 108 (e.g., service platform 20) and a server 110 (e.g., second communication device 15). The intermediary device 106 and server 108 may communicate with each other via a network 96 (e.g., network 30). The intermediary device 106 may communicate with the server 110 and the electronic devices 100, 102 and 104 via a home network 98. In this exemplary embodiment, the home network may be a local area network (LAN) used to connect multiple devices (e.g., electronic devices 100, 102, and 104, intermediary device 106 and server 108) within a residence or the like of the user. However, the home network may be used in any suitable environment which may consist of an environment other than a residence (e.g., a business or corporate environments, etc.).

In this exemplary embodiment, the electronic devices 100, 102 and 104 may be rendering devices (e.g., third communication device 25). In this regard, the intermediary device 106 may provide content in a desired DRM format to one or more of electronic devices 100, 102 and 104. The providing of content by the intermediary device 106 may be performed by streaming the content to electronic devices 100, 102 and 104. It should be pointed out that the intermediary device 106 may include a memory such as memory device 76 which may store content in one or more DRM formats.

The electronic devices 100, 102, and 104 may render (e.g., play or execute) the content streamed by the intermediary device 106 and may, but need not, be unable to stream the content to other electronic devices. The electronic devices 100, 102 and 104 may not include a memory such as memory device 76, but rather may include a buffer memory which may allow portions of content to be played or executed as it is received (via a stream for example). However, it should be pointed out that the storage capacity of the buffer memory is typically not large enough to store all of the data associated with content that is being uploaded to the electronic devices 100, 102, and 104. As such, the electronic devices 100, 102 and 104 are typically unable to provide another electronic device with content in a DRM format that the electronic devices 100, 102 and 104 received via a stream.

An exemplary embodiment of the invention will now be described with reference to FIG. 4. For purposes of illustration and not of limitation, consider an example in which a user of a device such as the server 110 (e.g., second communication device 15) desires to upload content in a particular DRM format to an intermediary device (e.g., intermediary device 106) so that the intermediary device may provide the content to one or more electronic devices (e.g., electronic device 104) in the home network 98 for rendering the content. In the example described below, DRM formats A, B and C may, but need not, relate to OMA DRM, Windows™ Media DRM, and DVB CPCM formats.

It should be pointed out that the content management engine 80 of the intermediary device 106 may receive indications of one or more DRM capabilities that are supported by each of the electronic devices 100, 102, 104 as well as the server 110 in response to the electronic devices 100, 102, 104 and the server 110 announcing or advertising their capabilities in message or signal that is sent to the intermediary device 106. In this regard, the content management engine 80 may generate a list of the DRM format capabilities of each of the electronic devices 100, 102, 104 and server 110 and may also include the DRM format capabilities that intermediary device 106 is configured to support in the list. The content management engine 80 may send the generated DRM capabilities list to the server 110 so that the server 110 may be aware of the DRM format capabilities of the electronic devices 100, 102, 104 and the intermediary device 106. Alternatively or additionally, the list may be organized by the content management engine 80 so that it contains entries for each of the DRM formats (e.g., DRM formats A, B, C) that the intermediary device 106 has discovered to be supported by some electronic device on the network, each such entry followed by the identifier(s) of the device or devices that support the particular DRM format.

In one exemplary embodiment, the content management engine 80 of the intermediary device 106 may organize its own DRM format capability list in the same order as an aggregate list of DRM formats supported by all the devices in the network (e.g., home network 98) is organized, and the content management engine 80 of the intermediary device 106 may make its own DRM capability list available to other devices on the network, so that the DRM capability list of the intermediary device may be used as a prioritized acceptable input format list for content upload transactions to the intermediary device 106. In this regard, the content management engine 80 of the intermediary device 106 may generate and arrange its own DRM format capability list in accordance with a prioritized list of DRM format capabilities of other devices (e.g., electronic devices 100, 102 and 104) and may then provide this DRM format capability list as the acceptable DRM format list to other devices (e.g., server 110) that may upload content to the intermediary device 106. It should be pointed out that the DRM format capability list of the intermediary device may be limited to the DRM formats that the intermediary device supports. For example, if the prioritized list of DRM format capabilities of the other devices (e.g., electronic devices 100, 102 and 104) in the network corresponds to DRM formats A, B, C and D and the intermediary device 106 does not support DRM format D, the content management engine 80 of the intermediary device 106 may not include DRM format D in its DRM format capability list.

When a user of the server 110 desires to upload content (e.g., a video clip) in a desired DRM format to an intermediary device 106 so that the device 106 may provide the content to an electronic device for rendering, the user may utilize a pointing device or the like of the user input interface (e.g., user input interface 82) to select the content that is desired to be uploaded to the intermediary device. In this regard, the processor (e.g., processor 84) of the server 110 may generate a message which may be shown on a display of the server 110. The message may offer or provide the user an option to indicate which electronic device that he would like the selected content to be rendered on. It should be pointed out that the user may utilize the user input interface (e.g., a pointing device, or a touch-sensitive display) to select an electronic device such as electronic device 104 in this example.

In response to the selection of the electronic device 104, by the user, the processor of the server 110 may evaluate the DRM format capabilities list to determine the DRM format(s) that the electronic device 104 is configured to support. In this regard, processor of the server 110 may determine that the electronic device 104 is configured to support a DRM format such as for example DRM format C. In response to determining that the electronic device supports DRM format C, the processor of the server 110 may determine whether the content in the desired DRM format is locally stored in a memory of the server 110. If the content in the desired DRM format (e.g., DRM format C) is locally stored, the processor of the server 110 may upload the content in the desired DRM format to the intermediary device 106 which may provide the content to the electronic device 104 by streaming the content to the electronic device 104. In this regard, the content management engine 80 of the electronic device 104 may render (e.g., play, display or execute) the content.

However, if the processor of the server 110 determines that the content in the desired DRM format is not stored locally in the server 110, and that the DRM format is supported by the intermediary device 106, the processor of the server 110 may generate a request that may be sent to the server 108. The request may include information requesting the content in the desired DRM format. In this exemplary embodiment, the processor of the server 110 may determine that a memory of the server 110 does not have a locally stored copy of the content in the desired DRM format (e.g., DRM format C). For instance, the processor of the server 110 may determine that it only has a copy of the content in DRM format A and by evaluating the DRM capabilities list, the processor of the server 110 may determine that the intermediary device 106 is configured to support DRM formats B and C, for example.

As such, the processor of the server 110 may generate a request for the content in DRM format C and may send this request to a network device such as for example server 108 which may store content in one or more DRM formats. The request that is sent by the processor of the server 110 to the server 108 may also include data associated with a token indicating that server 110 has possession of the content in DRM format A and the data may include the DRM capabilities list which may indicate whether the intermediary device 106 is configured to support the content in DRM format C, since the intermediary device 106 may be used to stream the content to electronic device 104. In response to verifying the token and that the intermediary device 106 is configured to support the content in DRM format C, the processor of the server 108 may upload the content in DRM format C to the intermediary device 106. The content management engine 80 of the intermediary device 106 may store the content in DRM format C in memory device 76 and may provide the content in DRM format C to the electronic device 104 by streaming the content and the content management engine 80 of the electronic device 104 may render (e.g., play or execute) the content.

It should be pointed out that the server 110 may include a control point (also referred to herein as Digital Media Controller) since the server is configured to generate commands for the performance of one or more tasks or operations including but not limited to selection of an electronic device(s) that content is to be rendered on in a desired DRM format and generating a request for content to be uploaded in a desired DRM format to intermediary device 106 by a server 108, for example.

Additionally, it should be pointed out that the electronic devices 100, 102 and 104 may be configured to support more than one DRM format. As such, the content management engine 80 may determine a preferred DRM format for the electronic devices that may support more than one DRM format. In an exemplary embodiment, the content management engine 80 of the intermediary device 106 may determine the preferred DRM format of the electronic devices in the home network based on the first DRM format that the content management engine 80 evaluates which matches a DRM format supported by the intermediary device 106 and the server 110. In this regard, when the user selects an electronic device that he wants to render content on, the processor of the server 110 may use the preferred DRM format as the DRM format corresponding to the selected electronic device.

In an alternative exemplary embodiment, the content management engine 80 of the intermediary device 106 may optionally arrange the electronic devices (e.g., electronic devices 100, 102, and 104) in the DRM format capabilities list (e.g., DRM format capabilities list 112) in order based on the preferred electronic devices of the intermediary device 106. In an exemplary embodiment, the content management engine 80 of intermediary device 106 may arrange the electronic devices in the list 112 based on the frequency in which the electronic devices 100, 102 and 104 are provided or streamed content by the intermediary device 106. For instance, in the example embodiment of the DRM format capabilities list 112, the content management engine 80 may determine that the intermediary device 106 provides content more frequently to electronic device 104 than any other electronic device. The content management engine 80 may also determine that intermediary device 106 provides content to electronic device 102 more frequently than electronic device 100. As such, the content management engine 80 of intermediary device 106 may arrange the electronic device 104 first, the electronic device 102 second and the electronic device 100 third in the DRM format capabilities list 112.

The content management engine 80 may send the DRM format capabilities list 112 to the server 110. In this regard, when a user desires to upload content, stored on server 110, the user may utilize the pointing device of the user input interface of the server 110 to select the content and the processor of the server 110 may evaluate the DRM format capabilities list 112 and may automatically determine a preferred electronic device that is to render the content based on the order of the electronic devices in the list 112.

In the exemplary embodiment of the DRM format capabilities list 112, the electronic device 104 is first in the DRM format capabilities list 112 and as such, the processor of the server 110 may determine that the preferred electronic device is electronic device 104 and may also determine that electronic device 104 is configured to support a DRM format, such as for example DRM format C, based at least in part on evaluating data (e.g., the DRM format that electronic device 104 is configured to support) in the list 112. In this regard, the user does not need to select the electronic device that the user would like to render the content on.

In response to the processor of the server 110 determining that the preferred electronic device in which to render the content is electronic device 104 and determining that electronic device 104 is configured to support DRM format C, the processor of the server 110 or the processor of server 108 may upload the intermediary device 106 with the content in DRM format C so that the intermediary device 106 may provide the content to the electronic device 104 in a manner analogous to that described above.

While the DRM format capabilities list 112 may be generated by the content management engine 106 based on the frequency in which the intermediary device 106 provides (e.g., provides or streams) content to the other devices 100, 102, 104 for rendering in the manner described above, it should be pointed out that the content management engine 80 may arrange and order the electronic devices and the DRM formats supported by these devices in the list based on any other suitable mechanisms. For instance, the content management engine 80 of the intermediary device 106 may determine the order of the electronic devices in the list 112 by determining an electronic device that was most recently used. This may be determined by the content management engine in response to evaluating data associated with a timestamp indicating when the electronic device was last used. The timestamp may be provided to the intermediary device 106 when the corresponding electronic device advertises its capabilities. In this regard, the most recently used electronic device may be listed first in the list 112 and may be designated as a preferred electronic device for rendering content.

Additionally, the content management engine 80 may determine the order of the electronic devices in the list 112 based on the most frequently used electronic device. The content management engine 80 of the intermediary device 106 may determine which of the electronic devices in the home network was most recently used in response to evaluating data in a signal that may be sent to the content management engine 80 of intermediary device 106 by the electronic devices 100, 102 and 104. The signal may contain data indicating the number of times that the corresponding electronic device was used in a given time period. In this regard, the most frequently used electronic device may be listed first in the list 112 and may be designated as a preferred electronic device for rendering content.

The content management engine 80 of the intermediary device 106 may also determine the order of the electronic devices in the list 112 based on one or more preferences established by a user. In this regard, the user may generate a profile that may be stored in a memory of the intermediary device 106 and the profile may specify the order of the user's preferred electronic devices. The electronic devices in the profile may be assigned a priority. The content management engine 80 may examine the data in the profile in generating the DRM format capabilities list 112 and may arrange the electronic devices in the list 112 based on the priority assigned to the electronic devices by the user. In this regard, the content management engine 80 of intermediary device 106 may designate the electronic device that is assigned the highest priority in the profile as the most preferred electronic device.

In an alternative exemplary embodiment, the content management engine of the intermediary device 106 may determine the DRM format (e.g., DRM format B) that is used by most of the electronic devices 100, 102 and 104 and may arrange the electronic devices 100, 102 and 104 in the list 112 based on the DRM formats that are used most often by the devices 100, 102, 104. In this regard, the devices that support DRM formats that are used most often in a network (e.g., home network 98) may appear at the top of the list 112 by the content management engine 80 of intermediary device 106 indicating that these electronic devices are preferable for rendering content. It should also be pointed out that the electronic devices associated with less frequently used DRM formats may be listed in lower positions of the list 112 by the content management engine 80 of intermediary device 106 denoting that these electronic devices may not be preferred or may be less preferable for rendering content.

Figure 5:
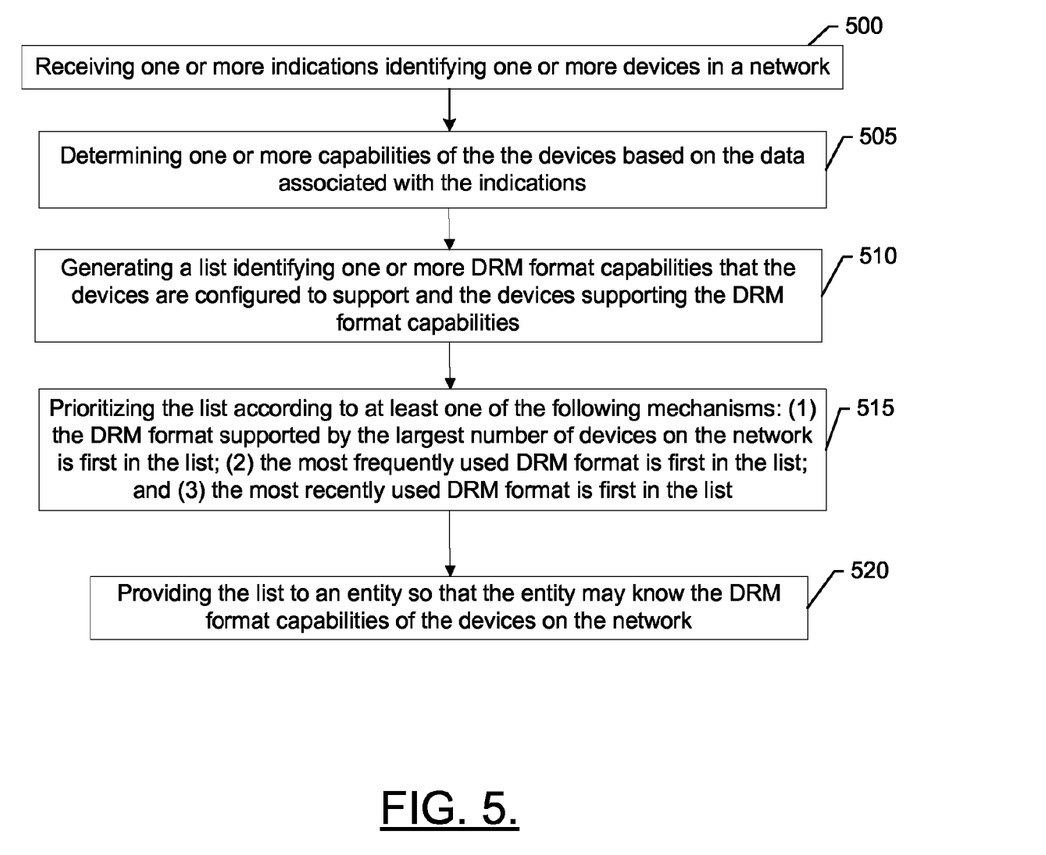
FIG. 5 illustrates an example of operation of the intermediary device of FIG. 4 according to an exemplary embodiment of the invention.

FIG. 5 illustrates an example of a process of operation of the intermediary device of FIG. 4 according to an exemplary embodiment. At operation 500, the content management engine 80 of the intermediary device 106 (e.g., apparatus 50) is configured to receive one or more indications identifying one or more electronic devices (e.g., electronic devices 100, 102, 104) in a network such as for example a home network. The indications may be messages or signals sent from the electronic devices providing their network address, supported device and service types and the capabilities that the devices may support. At operation 505, the content management engine 80 may determine one or more capabilities of the electronic devices based on the data in the indications. In this regard, the content management engine 80 may determine one or more DRM formats that the electronic devices are configured to support. At operation 510, the content management engine is configured to generate a list (e.g., a DRM format capabilities list) identifying one or more DRM format capabilities that the electronic devices are configured to support and may include data identifying the electronic devices that support the DRM format capabilities.

At operation 515, the content management engine 80 may prioritize the DRM format capabilities list (e.g., DRM format capabilities list 112) according to at least one of the following mechanisms: (1) the DRM format supported by the largest number of devices (e.g., electronic devices 100, 102, and 104) on the network is first in the list; (2) the most frequently used DRM format by the devices on the network is first in the list; and (3) the most recently used DRM format by an electronic device on the network is first in the list. At operation 520, the content management engine is configured to provide the list to an entity (e.g., server 110) so that the entity may know the DRM capabilities of the devices on the network.

Figure 6:
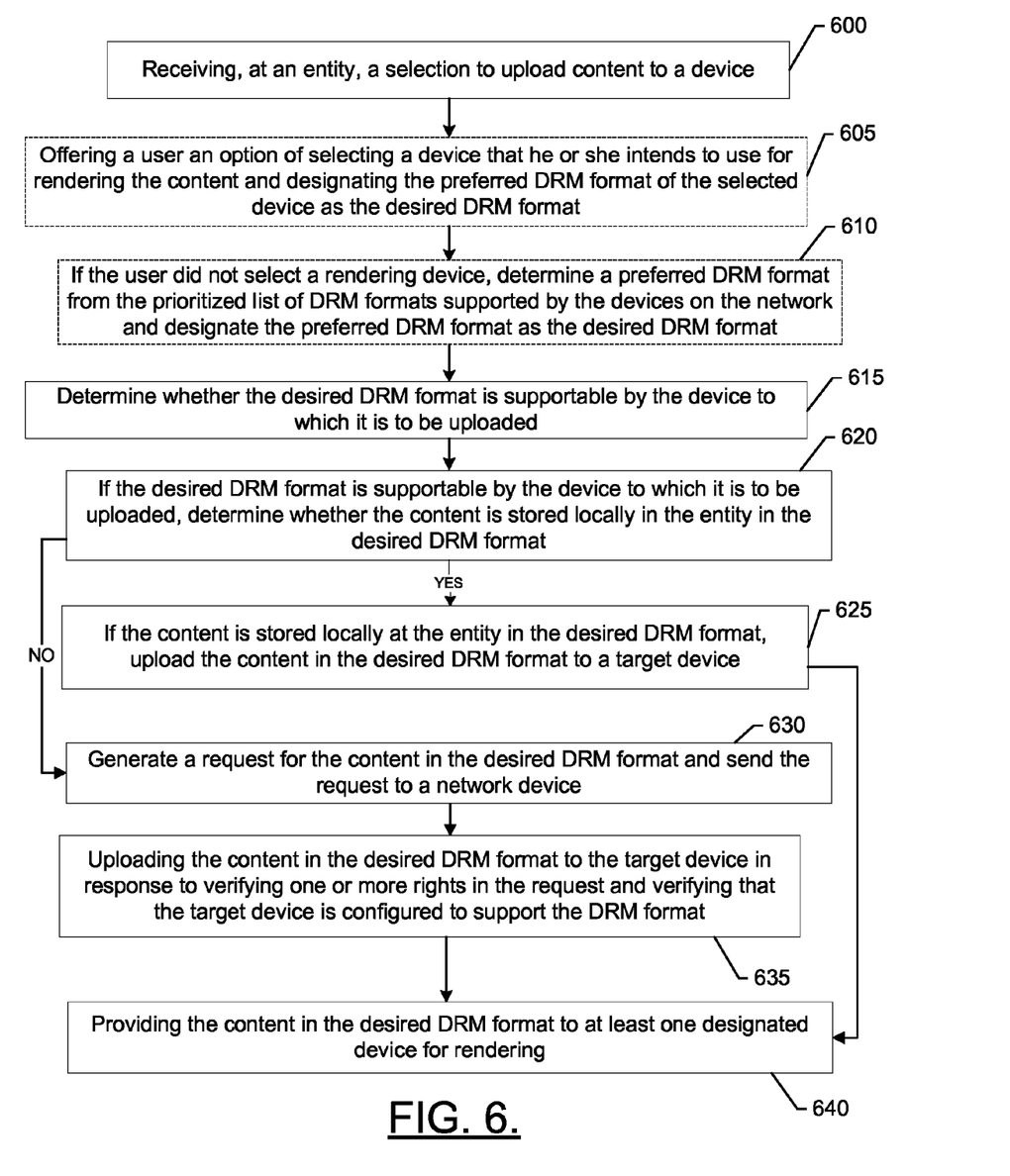
FIG. 6 illustrates a flowchart according to an exemplary method for providing protected content for rendering to one or more devices by reacquisition of the content according to an exemplary embodiment.

FIG. 6 illustrates a flowchart for a method of providing protected DRM content for rendering to one or more electronic devices by reacquisition of the content according to an exemplary embodiment. It should be pointed out that the order of the operations of FIG. 6 are one example for providing protected DRM content for rendering to one or more electronic devices. However, the order of operations may be different without departing from the spirit and scope of the invention. At operation 600, a processor of an entity (e.g., server 110) may receive a selection to upload content to a device, such as for example a target device (e.g., intermediary device 106). Optionally, at operation 605, the processor (e.g., processor 84) of the entity may offer a user an option to select or designate a device (e.g., electronic device 104) that he or she intends to use for rendering the content. It should be pointed out that the selection of the device may be performed by a user utilizing a user input interface (e.g., user input interface 82). The processor (e.g., processor 84) may then determine the desired DRM format by examining the DRM capabilities list for the selected device (e.g., electronic device 104), which may be stored by intermediary device 106, or obtained directly from the selected device (e.g. electronic device 104). In an exemplary embodiment, the preferred DRM format will be the first DRM format in the list. It should be pointed out that utilizing the DRM capabilities list stored by intermediary device 106 has the advantage that the DRM capability information is available also when the electronic device 104 is absent from the network (e.g. away from home, or switched off). Optionally, at operation 610, if the user did not select a device (also referred to herein as a rendering device, e.g., electronic device 104) to use for rendering the content, the processor of the entity is configured to determine the preferred DRM format from a prioritized list (e.g. DRM format capabilities list 112) of DRM formats supported by the devices on the network and designate the preferred DRM format as the desired DRM format.

At operation 615, the processor of the entity may determine whether the desired DRM format is supportable by the device to which it is to be uploaded. At operation 620, if the desired DRM format is supportable by the device to which it is to be uploaded, the processor is configured to determine whether the content is stored locally in the entity in the desired DRM format. At operation 625, if the processor of the entity determines that the content is stored locally at the entity in the desired DRM format, the processor of the entity may upload the content in the DRM format to the target device (e.g., intermediary device 106). The method may then continue at operation 640, in which the content management engine 80 of the target device (e.g., intermediary device 106) may provide the content to at least one designated device (e.g., electronic device 104) for rendering.

At operation 630, if the content in the DRM format is not stored locally at the entity, the processor of the entity may generate a request for the content in the desired DRM format and may send the request to a network device (e.g., server 108). The request may include data associated with a token indicating that the entity has rights to the content and that the entity has possession of the content in another DRM format. Additionally, the request may include information specifying that the target device is configured to support the content in the desired DRM format.

At operation 635, the network device (e.g., server 108) may upload the content in the desired DRM format to the target device (e.g., intermediary device 106) in response to verifying that the target device is configured to support the DRM format. At operation 640, the content management engine 80 of the target device may provide the content in the desired DRM format to at least one designated device (e.g., electronic device 104) for rendering.

It should be pointed out that FIGS. 5 and 6 are flowcharts of a system, method and computer program product according to exemplary embodiments of the invention. It will be understood that each block or step of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76, memory 86 and a buffer memory) and executed by a processor (e.g., processor 70, content management engine 80, processor 84). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks or steps to be implemented. In some embodiments, the computer program instructions are stored in a computer-readable memory that can direct a computer or other programmable apparatus to function in a particular manner, such that the instructions stored in the computer-readable memory produce an article of manufacture including instructions which implement the function specified in the flowchart blocks or steps. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart blocks or steps.

Accordingly, blocks or steps of the flowchart support combinations of means for performing the specified functions and combinations of steps for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In an exemplary embodiment, an apparatus for performing the method of FIGS. 5 & 6 above may comprise a processor (e.g., the processor 70) configured to perform some or each of the operations (500-520) and (600-640) described above. The processor may, for example, be configured to perform the operations (500-520) and (600-640) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (500-520) and (600-640) may comprise the structure associated with, for example, the processor 70 the content management engine 80, the processor 84 and/or a device or circuit for executing instructions or executing an algorithm for processing information as described above. As such, in some embodiments, the apparatus for performing at least some of the operations of the method of FIGS. 5 & 6 may include at least one processor and at least one memory storing computer program code. The at least one memory and the computer program code may be configured to, with the processor, perform at least some of the operations (500-520) and (600-640).

Thus, a method according to an exemplary embodiment of the invention may include determining, via a processor, one or more Digital Rights Management (DRM) formats that one or more devices support in response to receipt of one or more indications, and arranging data identifying the device based at least in part on the DRM formats that correspond to the devices. The method may further include facilitating receipt of content in at least one DRM format that at least one of the devices supports in response to a determination that a first device was selected to provide the content to the at least one device for rendering.

The method may further include determining that receipt of the content is inform a second device in response to a determination that the second device has a locally stored copy of the content in the DRM format and a determination that the first device has rights to use the content in the DRM format. The method may further include determining that facilitating receipt comprises receiving the content from a third device in response to a second device determining that it does not have a locally stored copy of the content in the DRM format. In one exemplary embodiment, the method may further include determining that the at least one device was selected in response to receipt of an option to select a device, among the devices, to render the content. The method may further include selecting the DRM format based on information in a list that designates the DRM format as a preferred DRM format. The information in the list prioritizes the DRM formats.

The method may further include prioritizing the list on the basis of at least one of a DRM format that is supported by a largest number of devices in a network, a DRM format that is most frequently used by the devices in the network, or a DRM format that is most recently used by one of the devices in the network. In an alternative exemplary embodiment, the method may further include determining that the device was selected in response to receipt of a selection of the device based on a highest priority that is assigned to the device.

The method may further include determining that the device supports the at least one DRM format. The method may further include determining that arranging includes ordering the data identifying the devices based on a priority assigned to each of the devices and the method may further include determining that a highest priority assigned to at least one of the devices denotes a preferred device in which to render the content.

In one embodiment, the method may further include determining the highest priority on the basis of information indicating a most frequently used device among the devices. The method may further include determining that receipt is in response to a second or third device uploading the content in the DRM format to the first device. The method may further include generating an organized list of DRM format capabilities associated with the first device based on a prioritized list of DRM formats supported by each of the devices and providing the organized list to at least a second device as an acceptable format list for content upload transactions to the first device.

An apparatus according to an exemplary embodiment may include at least one processor and at least one memory storing computer program code. The at least one processor and the at least one memory may be configured to, with the processor, perform at least determining one or more Digital Rights Management (DRM) formats that one or more devices support in response to receipt of one or more indications, and arranging data identifying the devices based at least in part on the DRM formats that correspond to the devices. The computer program code may further cause the apparatus to facilitate receipt of content in at least one DRM format that at least one of the devices is configured to support in response to a determination that a first device was selected to provide the content to the at least one device for rendering.

The computer program code may further cause the apparatus to determine that the receipt of the content is from a first device in response to a determination that the first device has a locally stored copy of the content in the DRM format and a determination that the apparatus has rights to use the content in the DRM format. The computer program code may further cause the apparatus to determine that receipt comprises receiving the content from a second device in response to a first device determining that it does not have a locally stored copy of the content in the DRM format. In one exemplary embodiment, the determination may include determining that the at least one device was selected in response to receipt of an option to select a device, among the devices, to render the content.

The computer program code may further cause the apparatus to select the DRM format based on information in a list that designates the DRM format as a preferred DRM format, the information in the list prioritizes the DRM formats. The computer program code may further cause the apparatus to prioritize the list on the basis of at least one of a DRM format that is supported by a largest number of devices in a network, a DRM format that is most frequently used by the devices in the network, or a DRM format that is most recently used by one of the devices in the network. In another exemplary embodiment, the determination may include determining that the device was selected in response to receipt of a selection based on a highest priority that is assigned to the device. The computer program code may further cause the apparatus to determine that the device supports the at least one DRM format.

The computer program code may further cause the apparatus to arrange the data by ordering the data identifying the devices based on a priority assigned to each of the devices and the computer program code may further cause the apparatus to determine that a highest priority assigned to one of the devices denotes a preferred device in which to render the content. In one embodiment, the computer program code may further cause the apparatus to determine the highest priority on the basis of information indicating a most frequently used device among the devices.

The computer program code may further cause the apparatus to determine that receipt of the content is in response to a second or a third device uploading the content in the DRM format to the first device. The computer program code may further cause the apparatus to generate an organized list of DRM format capabilities associated with the first device based on a prioritized list of DRM formats supported by each of the devices and may provide the organized list to at least a second device as an acceptable format list for content upload transactions to the first device.

An exemplary computer program product may include at least one computer-readable storage medium having computer-executable program code instructions stored therein. The computer-executable program code instructions may include program code instructions for determining one or more Digital Rights Management (DRM) formats that one or more devices support in response to receipt of one or more indications, and arranging data identifying the devices based at least in part on the DRM formats that correspond to the devices. The computer program product may further include program code instructions for facilitating receipt of content in at least one DRM format that at least one of the devices supports in response to a determination that a first device was selected to provide the content to the at least one device for rendering.

The computer program product may include program code instructions for determining that receipt of the content is from a second device in response to a determination that the second device has a locally stored copy of the content in one of the DRM formats and a determination that the first device has rights to use the content in the DRM format. The computer program product may further include program code instructions for determining that receipt comprises receiving the content from a third device in response to a second device determining that it does not have a locally stored copy of the content in the DRM format.

The computer program product may further include program code instructions for determining that the DRM formats include at least one of an Open Mobile Alliance (OMA) DRM format, a Windows Media DRM format or a Digital Video Broadcasting (DVB) Content Protection & Copy Management (CPCM) format.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    determining, via a processor, one or more digital rights management formats that one or more devices support in response to receipt of one or more indications;
    causing a list to be generated, the list comprising information regarding digital rights management formats supported by the devices;
    causing the list to be provided to an entity; and
    facilitating receipt of content in at least one digital rights management format that at least one of the devices supports in response to a determination that a first device was selected to provide the content to the at least one device for rendering.

2. The method of claim 1, wherein receipt of the content is from a second device in response to a determination that the second device has a locally stored copy of the content in the digital rights management format and a determination that the first device has rights to use the content in the digital rights management format.

3. The method of claim 1, wherein facilitating receipt comprises receiving the content from a third device in response to a second device determining that it does not have a locally stored copy of the content in the digital rights management format.

4. The method of claim 1, wherein the determination further comprises determining that the at least one device was selected in response to receipt of an option to select a device, among the devices, to render the content.

5. The method of claim 1, further comprising selecting the digital rights management format based on information in a list that designates the digital rights management format as a preferred digital rights management format, the information in the list prioritizes the digital rights management formats.

6. The method of claim 1, wherein the determination further comprises determining that the device was selected in response to receipt of a selection of the device based on a highest priority that is assigned to the device.

7. The method of claim 1, wherein the list further comprises data identifying the devices, the method further comprising causing the data identifying the devices to be ordered based on a priority assigned to each of the devices and determining that a highest priority assigned to one of the devices denotes a preferred device in which to render the content.

8. The method of claim 1, further comprising causing an organized list of digital rights management format capabilities associated with the first device to be generated based on the list comprising information regarding digital rights management formats supported by each of the devices;
wherein causing the list to be provided to the entity comprises causing the organized list to be provided to at least a second device as an acceptable format list for content upload transactions to the first device.

9. An apparatus comprising:
at least one processor; and
at least one memory including computer program code, the at least one memory and the computer program code configured to, with the at least one processor, cause the apparatus to perform at least the following:
determine one or more digital rights management formats that one or more devices support in response to receipt of one or more indications;
cause a list to be generated, the list comprising information regarding digital rights management formats supported by the devices;
cause the list to be provided to an entity; and
facilitate receipt of content in at least one digital rights management format that at least one of the devices is configured to support in response to a determination that the apparatus was selected to provide the content to the at least one device for rendering.

10. The apparatus of claim 9, wherein the computer program code further causes the apparatus to determine that the receipt of the content is from a first device in response to a determination that the first device has a locally stored copy of the content in the digital rights management format and a determination that the apparatus has rights to use the content in the digital rights management format.

11. The apparatus of claim 9, wherein facilitating receipt comprises receiving the content from a second device in response to a first device determining that it does not have a locally stored copy of the content in the digital rights management format.

12. The apparatus of claim 9, wherein the determination comprises determining that the at least one device was selected in response to receipt of an option to select a device, among the devices, to render the content.

13. The apparatus of claim 9, wherein the computer program code further causes the apparatus to select the digital rights management format based on information in a list that designates the digital rights management format as a preferred digital rights management format, the information in the list prioritizes the digital rights management formats.

14. The apparatus of claim 9, wherein the determination comprises determining that the device was selected in response to receipt of a selection based on a highest priority that is assigned to the device.

15. The apparatus of claim 9, wherein the determination comprises determining that the device supports the digital rights management format.

16. The apparatus of claim 9, wherein the list further comprises data identifying the devices, the computer program code further causing the apparatus to cause the data identifying the devices to be organized based on a priority assigned to each of the devices and determine that a highest priority assigned to one of the devices denotes a preferred device in which to render the content.

17. The apparatus of claim 9, wherein receipt is in response to a first or a second device uploading the content in the digital rights management format to the apparatus.

18. The apparatus of claim 9, wherein the computer program code further causes the apparatus to cause an organized list of digital rights management format capabilities associated with the first device to be generated based on the list comprising information regarding digital rights management formats supported by each of the devices;
wherein the apparatus is caused to cause the list to be provided to the entity by causing the organized list to be provided to at least a second device as an acceptable format list for content upload transactions to the first device.

19. A computer program product comprising at least one non-transitory computer-readable storage medium having computer-readable program code portions stored therein, the computer-readable program code portions being configured to, upon execution, cause an apparatus to at least:
determine one or more digital rights management formats that one or more devices support in response to receipt of one or more indications;
cause a list to be generated, the list comprising information regarding digital rights management formats supported by the devices;
cause the list to be provided to an entity; and
facilitate receipt of content in at least one digital rights management format that at least one of the devices supports in response to a determination that a first device was selected to provide the content onto the at least one device for rendering.

20. The computer program product of claim 19, further comprising program code instructions configured to, upon execution, cause the apparatus to determine that the digital rights management formats comprise at least one of an open mobile alliance (OMA) digital rights management format, a Windows Media digital rights management format or a digital video broadcasting (DVB) content protection & copy management (CPCM) format.

* * * * *